United States Patent [19]
Dawes

[11] Patent Number: 5,815,355
[45] Date of Patent: Sep. 29, 1998

[54] MODULATION COMPENSATED CLAMP CIRCUIT

[75] Inventor: Alan M. Dawes, Swindon, United Kingdom

[73] Assignee: Atmel Corporation, San Jose, Calif.

[21] Appl. No.: 944,321

[22] Filed: Oct. 6, 1997

[51] Int. Cl.⁶ ...................................................... H02H 9/00
[52] U.S. Cl. .............................. 361/56; 361/111; 361/113; 361/91
[58] Field of Search ................................ 361/56, 58, 111, 361/113, 91; 340/870.17, 870.18, 870.31, 870.54

[56] References Cited

U.S. PATENT DOCUMENTS

| | | |
|---|---|---|
| 4,333,072 | 6/1982 | Beigel ................................ 340/825.54 |
| 5,041,826 | 8/1991 | Milheiser ........................... 340/825.54 |
| 5,053,774 | 10/1991 | Schuermann et al. .................... 342/44 |
| 5,479,172 | 12/1995 | Smith et al. .............................. 342/51 |

*Primary Examiner*—Jeffrey A. Gaffin
*Assistant Examiner*—Stephen Jackson
*Attorney, Agent, or Firm*—Thomas Schneck; George B.F. Yee

[57] ABSTRACT

A radio frequency identification (RFID) tag includes a tank circuit for receiving a power signal transmitted on a radio frequency (RF) carrier by a remote interrogator unit. Information is conveyed from the tag to the interrogator by varying a resistive load placed across the tank circuit as a function of data read from memory. Corresponding variations in the reflected signals are then detected by the interrogator. An overvoltage circuit cooperates with a modulation circuit for providing transmission of data even during an overvoltage condition, thus avoiding masking of the signal under such conditions.

18 Claims, 3 Drawing Sheets

MODULATION COMPENSATED CLAMP CIRCUIT

TECHNICAL FIELD

The present invention generally relates to radio frequency identification ("RFID") devices, and more particularly to an RFID for close proximity operation.

BACKGROUND ART

Remote electronic identification devices typically consist of remotely disposed transponders and an interrogator unit. The operating range of such devices depends on the underlying architecture of the transponder unit. In U.S. Pat. No. 4,333,072 to Beigel, for example, a remote identification system consists of a probe circuit (interrogator) operating in close proximity to an implant circuit (transponder). The implant circuit is powered when the probe circuit is brought close to the implant, producing a voltage by induction across a coil in the implant. Information from the implant is transferred to the probe by varying the inductive load on the implant's coil and detecting such variations in the probe. This mode of operation requires that the probe be very closely spaced from the implant, thus greatly limiting the range of operation of such devices.

Other remote identification systems use radio frequency signaling to provide the communication link between interrogator and transponder. In one class of these radio frequency identification (RFID) devices, the RF signal includes a power signal that is transmitted to the transponder device. This power signal charges up a power supply capacitor in the transponder, which serves as the power source for the transponder. The transmission of data from the transponder involves the generation and transmission of radio frequency energy. The power supply capacitor must be of sufficient size to provide adequate power for such transmissions. Such transponders allow reading distances on the order of 2 meters. This type of transponder, however, is not practical in applications requiring small size; e.g. livestock identification by subcutaneous implantation of the device.

In a third category of RFIDs, an alternative approach combines features from the above two designs. An interrogator transmits an RF signal which includes a power signal. The voltage induced across the transponder coil by the received power signal is sufficient to operate the transponder circuitry, but not sufficient to generate its own radio signal. A capacitor coupled in parallel with the coil forms a tank circuit, whose Q is varied by varying a resistive load placed across the tank circuit. This changes the tuning of the tank circuit, resulting in variations in the reflected signal which can be detected by the interrogator. Thus, the transponder is able to convey its data to the interrogator simply by modulating the resistive load accordingly and allowing the interrogator to detect variations in the reflected signal.

An overvoltage circuit is typically employed to protect the device against overvoltage conditions. Prior art solutions include the use of a zener diode which has a breakdown voltage at a level above which the voltage would be detrimental to the transponder. The diode is coupled between the pins of the transponder coil. The presence of an overvoltage condition across the coil causes the zener diode to conduct, thus driving $V_{dd}$ to ground and effectively turning off the device. U.S. Pat. No. 5,479,172 discloses another approach wherein $V_{dd}$ is compared against a reference voltage and a shunting transistor is turned on to shunt the current from a rectifier to ground, thus limiting $V_{dd}$ to the reference voltage.

A problem arises when the interrogator operates at close range. The strong signal from the interrogator causes the overvoltage circuit in the transponder to conduct. The current into the tank circuit, therefore, is affected both by operation of the overvoltage circuit and the modulated resistive load. When the transponder attempts to transmit data by varying the load resistance, which varies the current into the tank circuit, such variations in the current become masked by the operation of the overvoltage circuit.

The circuitry shown in FIG. 3 is typical of prior art transponders and illustrates how this masking effect comes about. A modulation signal varies the conductivity (resistance) of transistor R, thus changing the tuning of the tank circuit L/C, in accordance with data stored in the transponder. An overvoltage circuit 22 includes a comparator 21 and a shunt 23. When the overvoltage circuit 22 is turned on, there is no way to tell whether the current change is due to an overvoltage condition or to the modulation of transistor R. What can happen is that when the modulator turns on transistor R, current that might have flowed through the overvoltage shunt 23 will flow through transistor R instead. The overall magnitude of the current flow has not changed and so there is no change in the Q of the tank circuit. Since the Q (and thus the tuning) remains unchanged, there is no change in the reflected signal for the interrogator to detect, and thus no data transmission.

It is therefore desirable to have a transponder which can operate in close proximity to the interrogator, and thus exhibit a wide range of operating distances. What is needed is a transponder that is not affected by operation of an overvoltage circuit which is likely to turn on due to the strong signal received from a closely positioned interrogator.

SUMMARY OF THE INVENTION

In accordance with the present invention, a radio frequency identification (RFID) tag comprises a tank circuit for receiving a power signal transmitted on a radio frequency (RF) carrier by a remote interrogator unit. Information is conveyed from the tag to the interrogator by varying a resistive load placed across the tank circuit as a function of data read from memory. Corresponding variations in the reflected signals are then detected by the interrogator.

A voltage clamp provides overvoltage protection. Triggering of the clamp is produced by modulation in accordance with the data. The clamp includes a shunting means which operates in conjunction with a modulation circuit so that data transmission is possible even during an overvoltage condition.

BEST MODE FOR CARRYING OUT THE INVENTION

Figure 1:
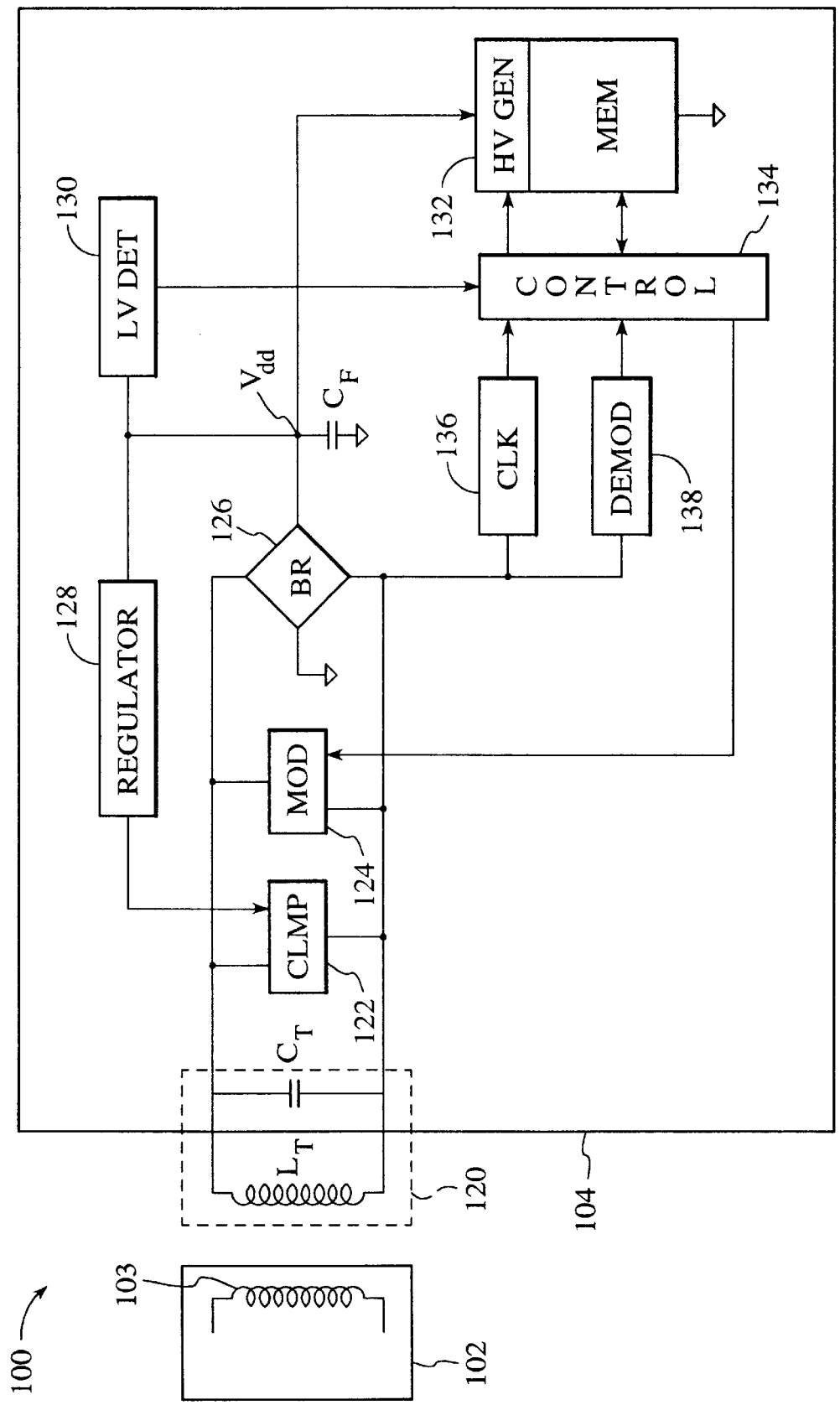
FIG. 1 shows a block diagram of the RFID tag in accordance with the present invention.

Referring to FIG. 1, a radio frequency identification (RFID) system 100 includes an interrogator unit 102 and a transducer unit (tag) 104. The interrogator 102 includes a transmit coil 103 for transmitting an RF signal to the tag 104.

The tag 104 comprises a pick-up coil $L_t$, which together with capacitor $C_t$, forms a tank circuit 120. Coupled across the tank circuit are a voltage clamp 122, a load modulation circuit 124, and a full-wave bridge rectifier 126. The voltage clamp 122 is an overvoltage protection device which limits the maximum voltage developed across the tank circuit 120. In such devices, the voltage across coil $L_t$ can increase to a level that is quite high, especially when the load is low and the Q of the tank circuit is high. Such high voltages are likely to cause failure of the device electronics. When the voltage across the coil nears the upper limit of the device, clamp 122 switches on to increase the current across the clamp and thus reduce the voltage to a safer level.

The modulation circuit 124, varies the loading across tank circuit 120, which in turn varies the Q factor of the tank circuit. The modulation circuit operates under the control of a controller 134 which varies the Q of tank circuit 120 in correspondence with the data to be conveyed to the interrogator 102. Varying the Q alters the reflected signal. Thus, the data is "transmitted" as the interrogator detects corresponding changes in the reflected signal.

The bridge rectifier 126 charges a small supply capacitor $C_f$ to provide the supply voltage $V_{dd}$ needed by the tag. The supply voltage provides power to a nonvolatile memory 132, which includes a voltage pump to provide a programming voltage $V_{pp}$. In addition to providing internal power to the transducer 104, the bridge circuit 126 also provides a clock signal, based on the incoming signal from the interrogator 102, to a clock generator 136.

The memory 132 is a 256-bit EEPROM, consisting of eight 32-bit pages. Page 0 is organized as a 24 bit datum plus eight write-lock bits. Pages 1–7 are user pages. The write-lock bits determine whether the corresponding 32-bit page can be written. Password protection is available. The password is stored in user page 7. Read and write access to the memory 132 are provided through controller 134. A demodulator 138 demodulates an incoming data signal and feeds the data into the controller 134 which then writes it to memory 132. The data signal includes a sequence of command bits followed by an optional sequence of data bits.

Figure 2:
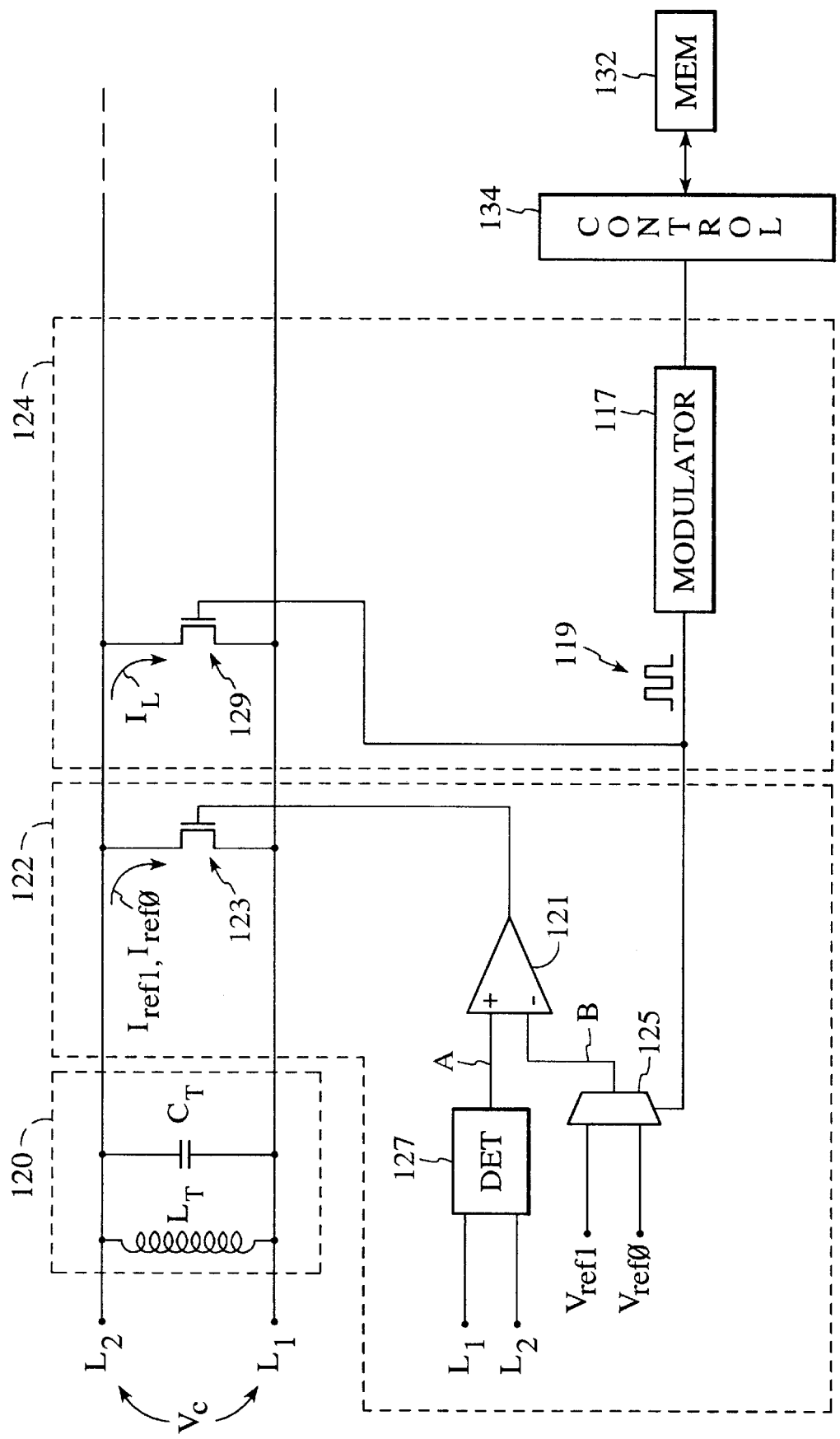
FIG. 2 illustrates the modulation circuit of the present invention.
Figure 3:
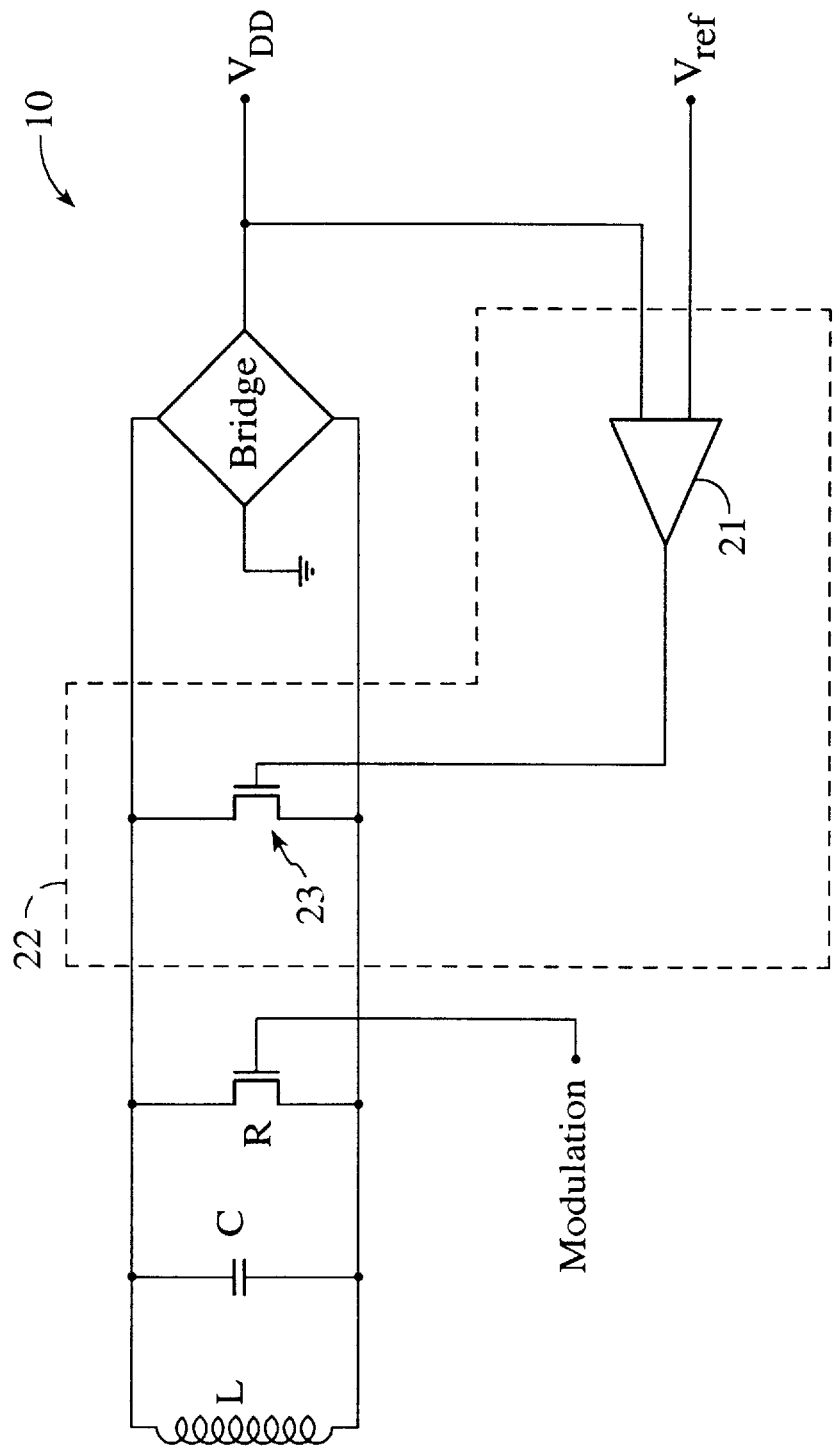
FIG. 3 shows a prior art modulation scheme.

Turning to FIG. 2, the modulation circuit 124 comprises an encoder/modulator 117 which drives the gate of a load transistor 129. The drain and source of the load transistor 129 are coupled across the terminals of tank circuit 120. The output pulses comprising a modulation signal 119 of encoder/modulator 117 modulate load transistor 129, turning the transistor on and off. As load transistor 129 alternates between conduction and nonconduction, the Q of the tank circuit 120 (i.e. its tuning) varies correspondingly. The encoder/modulator 117 is capable of a variety of well-known encoding schemes, including Manchester (bi-phase), Miller, differential bi-phase, and modified differential bi-phase encoding. The encoded signals can then be further modulated by phase shift keying or frequency shift keying.

In accordance with the present invention, the voltage clamp 122 comprises a shunt transistor 123 having a source-drain connection across tank circuit 120. An output of comparator 121 drives the gate of shunt transistor 123.

A detector 127 detects the potential difference $V_c$ across the coil $L_t$ which is fed into a first input A of the comparator. A voltage selector 125 switches one of two reference voltages $V_{ref1}$ and $V_{ref2}$ into a second input B of comparator 121. The modulation signal 119 feeds into selector 125 to switch between $V_{ref1}$ and $V_{ref2}$. When the voltage on the A input exceeds the voltage on the B input, comparator 121 outputs a voltage greater than the threshold voltage $V_t$ of shunt transistor 123, turning on the shunt resistor. When the voltage on input A is less than the voltage on the B input, comparator 121 outputs a voltage less than $V_t$ which will maintain shunt transistor 123 in the off condition.

Still referring to FIG. 2, the modulation circuit 124 and voltage clamp circuit 122 cooperate in the following manner. Controller 134 reads memory 132 and produces a corresponding series of pulses 119 representing the 1's and 0's of the data via modulator 117. Assume that a '1' pulse turns on load transistor 129 and that a '0' pulse turns it off. Thus, for a '1' bit, the load transistor is turned on, resulting in a load current $I_L$ which "bleeds" current from the tank circuit 120 and decreases its Q. Conversely, for a '0' bit, the load transistor is off, thus eliminating the loading on the tank circuit and increasing its Q.

This is the typical operation of the tag during a non-overvoltage condition. Recall, however, that the pulses 119 also drive selector 125 whose output feeds into comparator 121. For discussion purposes, assume that a '1' pulse selects $V_{ref1}$ and a '0' pulse selects $V_{ref0}$, and that $V_{ref1}$ is greater than $V_{ref0}$. In the non-overvoltage condition, the coil voltage $V_c$ will be less than both $V_{ref1}$ and $V_{ref0}$. The output of comparator 121, therefore, will be negative (i.e. less than $V_t$ of shunt transistor 123) and thus shunt transistor will remain non-conductive.

Consider next an overvoltage condition where the potential $V_c$ across coil $L_t$ becomes equal to or greater than the upper voltage limit $V_{Lim}$ of the tag, above which damage to the device is likely to occur.

For each occurrence of a '1' bit during an overvoltage condition, the load transistor 129 is turned on as described above, causing load current $I_L$ to flow out of the tank. In addition, $V_{ref1}$ is switched into comparator 121 whose output is ($V_c - V_{ref1}$). Properly selecting $V_c$ and $V_{ref1}$ will turn shunt transistor 123 on by a certain amount to draw additional current $I_{ref1}$ out of tank circuit 120. This will have the effect of lowering the Q as in the non-overvoltage case. In the overvoltage case, however, the Q is even lower because of the additional load current $I_{ref1}$. The additional load current $I_{ref1}$ has the further effect of lowering the coil voltage $V_c$ to a value below $V_{Lim}$, thus alleviating the overvoltage condition.

For each occurrence of a '0' bit during an overvoltage condition, the load transistor 129 remains off as in the case of the non-overvoltage condition. $V_{ref0}$ is switched into comparator 121. The output of comparator 121 is ($V_c - V_{ref0}$). Properly selecting $V_c$ and $V_{ref0}$ will cause shunt transistor 123 to draw current $I_{ref0}$ out of the tank circuit. However, since $V_{ref0}$ is less than $V_{ref1}$, the comparator will drive the gate of shunt transistor 123 at a higher voltage, causing a higher current flow $I_{ref0}$ through the shunt transistor. Thus although load transistor 129 is off for a '0' bit, shunt transistor 123 is on. $V_{ref0}$ is set so that load current $I_{ref0}$ alone is sufficient to lower the coil voltage $V_c$ to a value just below $V_{Lim}$, to alleviate the overvoltage condition.

Suppose in the case of a '0' bit, where the load current is $I_{ref0}$, the resulting Q is $Q_0$; and that in the case of a '1' bit, where the total load current experienced by tank circuit 120 is $I_L + I_{ref1}$, the resulting Q is $Q_1$. So long as $Q_0$ and $Q_1$ are sufficiently separate, a '0' bit can be distinguished from a '1' bit. Thus, it can be seen that by properly selecting $V_{ref1}$ and $V_{ref0}$ the tuning of the tank circuit can be varied sufficiently so as to change the signal reflected by the tag enough to distinguish between a '0' bit and a '1' bit. At the same time, the overvoltage condition is avoided (by virtue of the shunting currents $I_{ref1}$, $I_{ref0}$) without masking the signal carrying the data contained in the tag.

I claim:

1. A transponder of the type used in radio frequency identification systems, comprising:

a tank circuit;

an overvoltage circuit connected to the tank circuit having a shunting means for shunting current from the tank circuit during an overvoltage condition; and tuning means for varying the tuning of the tank circuit in accordance with data contained in the transponder, the tuning means operatively coupled with the shunting means to vary the amount of current shunted in accordance with the data.

2. The transponder of claim 1 wherein the shunting means includes a reference voltage selector for selecting between a first reference voltage and a second reference voltage, and a shunt transistor biased depending upon the selection of a reference voltage.

3. The transponder of claim 1 wherein the tuning means includes a modulation means for producing a modulation signal which represents data contained in the transponder, and load means for presenting a variable resistive load to the tank circuit; the modulation signal coupled to vary the resistive load.

4. The transponder of claim 3 wherein the load means is a transistor coupled across the tank circuit; a gate of the transistor being coupled to receive the modulation signal.

5. The transponder of claim 1 wherein the tank circuit includes an inductor coupled in parallel with a capacitor.

6. The transponder of claim 5 wherein the shunting means includes a transistor and a comparator; the transistor being coupled across the tank circuit; a gate of the transistor being coupled to an output of the comparator, the comparator having a first input coupled to the reference voltage selector and a second input coupled to receive the voltage across the coil.

7. A radio frequency identification transponder comprising:

first and second terminals;

a tank circuit including a coil coupled across the first and second terminals and a capacitor coupled across the first and second terminals;

a memory array;

a modulation means, coupled to the memory array, for producing a modulation signal which represents data contained in the memory array;

a variable resistive load coupled across the first and second terminals, the variable resistive load coupled to the modulation means for providing a variable resistance across the tank circuit in response to the modulation signal; and an overvoltage circuit coupled across the first and second terminals, including a reference voltage circuit coupled to the modulation means to produce a reference voltage that varies in response to the modulation signal, the activation of the overvoltage circuit occurring when a supply voltage exceeds the reference voltage.

8. The transponder of claim 7 wherein the overvoltage circuit includes a shunt transistor and a comparator, the shunt transistor being coupled across the first and second terminals, a gate of the shunt transistor being coupled to the comparator, the comparator coupled to compare the supply voltage against the reference voltage.

9. The transponder of claim 8 wherein the variable resistive load is a load transistor coupled across the first and second terminals, the modulation signal being coupled to the gate of the load transistor.

10. The transponder of claim 7 further including a selector coupled to provide either a first reference voltage or a second reference voltage to the comparator, the selector coupled to provide a reference voltage in response to the modulation signal.

11. The transponder of claim 10 wherein the overvoltage circuit further includes a shunt transistor coupled across the first and second terminals, an output of the comparator being coupled to the gate of the transistor.

12. The transponder of claim 11 wherein the variable resistive load is a load transistor coupled across the first and second terminals, the modulation signal being coupled to the gate of the load transistor.

13. In a transponder of a radio frequency identification system, a method of clamping the transponder supply voltage, comprising:

modulating a resistive load across a tank circuit with a modulation signal;

selecting a first voltage reference when the modulation signal is at a first modulation level;

selecting a second voltage reference when the modulation signal is at a second modulation level;

comparing the supply voltage against a selected reference voltage; and shunting current to across the tank circuit if the supply voltage exceeds the selected reference voltage.

14. The method of claim 13 wherein the step of modulating includes reading data stored in the transponder and producing the modulation signal to represent the data.

15. The method of claim 13 wherein the resistive load is a transistor coupled across the tank circuit and the step of modulating includes varying a biasing voltage applied to the gate of the transistor.

16. The method of claim 13 wherein the step of shunting current includes operating a transistor coupled across the tank circuit, by varying a biasing voltage applied to the gate of the transistor in response to the step of comparing.

17. The method of claim 13 wherein the step of modulating includes varying a first biasing voltage applied to the gate of a first transistor coupled across the tank circuit to vary the current flow through the first transistor; and the step of shunting includes varying a second biasing voltage applied to the gate of a second transistor in response to the step of comparing; the second transistor being coupled across the tank circuit.

18. The method of claim 17 wherein the step of modulating further includes reading data stored in the transponder and varying the first biasing voltage to represent the data.

* * * * *